United States Patent
Numazaki et al.

(10) Patent No.: US 6,369,796 B2
(45) Date of Patent: *Apr. 9, 2002

(54) INFORMATION INPUT APPARATUS

(75) Inventors: Shunichi Numazaki, Yokohama; Miwako Doi, Kawasaki; Yoshiyuki Matsunaga, Kamakura, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/878,295

(22) Filed: Jun. 12, 2001

(30) Foreign Application Priority Data

Feb. 13, 1998 (JP) .............................. 10-031659

(51) Int. Cl.[7] .............................. G09G 5/00; G09G 5/08
(52) U.S. Cl. ...................... 345/156; 345/157; 345/158; 250/200; 250/206.1
(58) Field of Search ................................ 345/156–150, 345/163, 168; 250/200, 206.1, 208.1

(56) References Cited

U.S. PATENT DOCUMENTS

| | | | | |
|---|---|---|---|---|
| 4,081,841 A | * | 3/1978 | Ochi et al. | 358/213 |
| 4,118,730 A | * | 10/1978 | Lemelson | 358/93 |
| 4,471,378 A | * | 9/1984 | Ng | 358/110 |
| 5,081,530 A | * | 1/1992 | Medina | 358/88 |
| 5,376,811 A | * | 12/1994 | Ikeda | 257/232 |
| 5,376,967 A | * | 12/1994 | Sakota et al. | 348/311 |
| 5,396,091 A | * | 3/1995 | Kobayashi et al. | 257/241 |
| 5,544,338 A | * | 8/1996 | Forslund | 395/421.07 |
| 5,668,631 A | * | 9/1997 | Norita et al. | 356/376 |
| 5,686,942 A | * | 11/1997 | Ball | 345/158 |
| 5,729,475 A | * | 3/1998 | Romanik, Jr. | 364/559 |
| 5,732,227 A | * | 3/1998 | Kuzunuki et al. | 395/333 |
| 5,751,843 A | * | 5/1998 | Maggioni et al. | 382/154 |
| 5,767,842 A | * | 6/1998 | Korth | 345/168 |
| 5,900,863 A | * | 5/1999 | Numazaki | 345/158 |
| 5,956,087 A | * | 9/1999 | Takayama et al. | 348/275 |
| 5,990,952 A | * | 11/1999 | Hamasaki | 348/311 |
| 6,144,366 A | * | 11/2000 | Numazaki et al. | 345/156 |
| 6,191,773 B1 | * | 2/2001 | Maruno et al. | 345/158 |
| 6,292,169 B1 | * | 9/2001 | Numazaki et al. | 345/156 |

* cited by examiner

*Primary Examiner*—Bipin Shalwala
*Assistant Examiner*—Jimmy H. Nguyen
(74) *Attorney, Agent, or Firm*—Oblon, Spivak, McClelland, Maier & Neustadt, P.C.

(57) ABSTRACT

CCD type charge transfer sections include vertical charge transfer sections and horizontal charge transfer sections having stages twice the number of lines of the vertical charge transfer sections. The horizontal charge transfer sections have a capacity capable of holding charges twice the number of lines of the vertical charge transfer sections. A controller controls an area image sensor to arrange charges of an object image corresponding to an irradiated state and charges of the object image corresponding to a non-irradiated state in the vertical charge transfer sections, and to transfer charges for two pixels per vertical charge transfer section to the horizontal charge transfer sections to hold the charges.

8 Claims, 14 Drawing Sheets

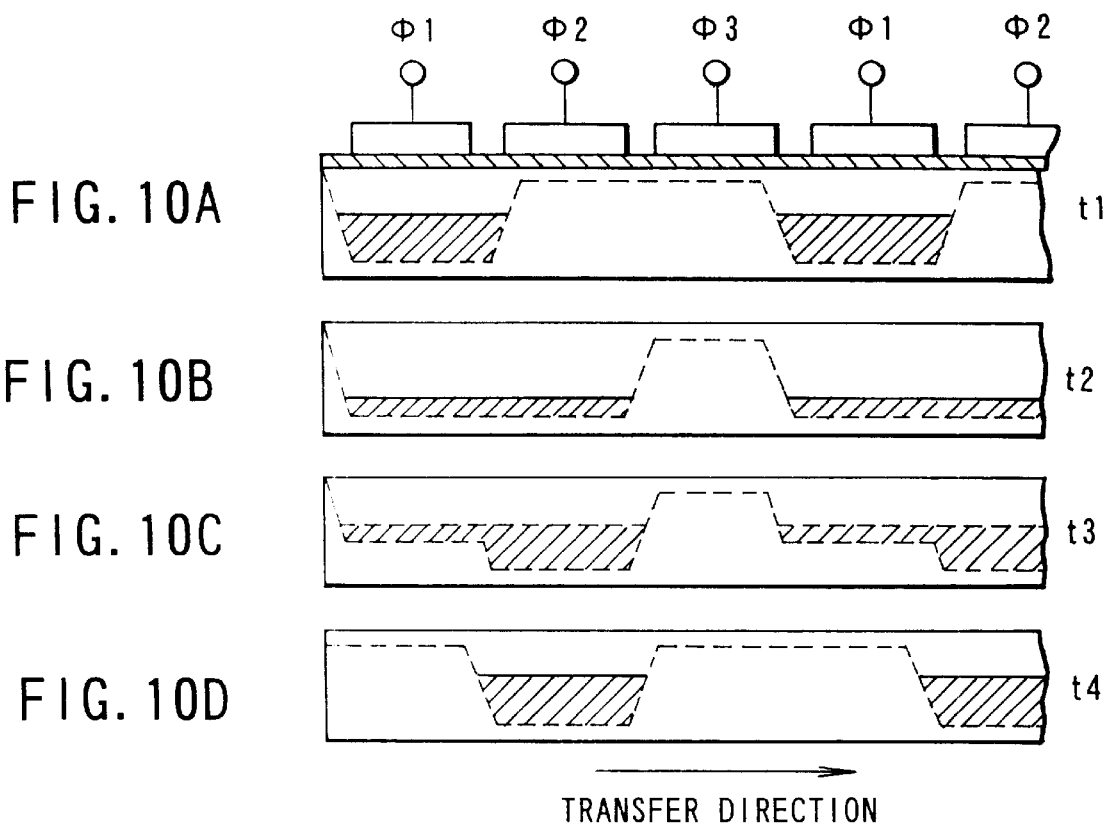
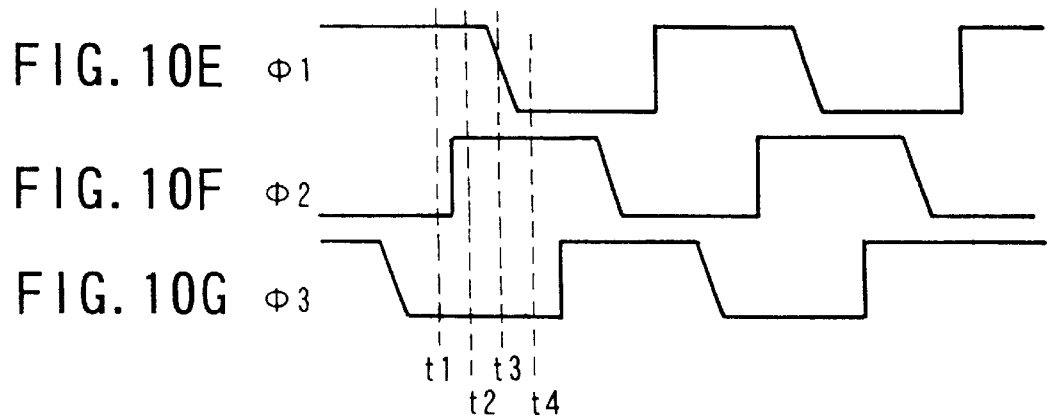
TRANSFER DIRECTION

INFORMATION INPUT APPARATUS

BACKGROUND OF THE INVENTION

This application is based on Japanese Patent Application No. 10-31659, filed Feb. 23, 1998, the contents of which are incorporated herein by reference.

The present invention relates to an information input apparatus which attains pointing in a three-dimensional space using an image.

As an input device to a computer, especially, a pointing input device, a mouse is prevalently used, since most computers equip it. However, the mouse is used to merely attain roles of a two-dimensional pointing device such as movement of the cursor, selection of a menu, and the like.

Since information the mouse can process is two-dimensional information, the mouse can hardly select, e.g., an object with a depth in a three-dimensional space. On the other hand, when the mouse is used for animating a character upon creating an animation, it cannot easily naturally animate the character.

In order to compensate for such difficulties in pointing in a three-dimensional space, various three-dimensional pointing devices have been developed.

As a typical three-dimensional pointing device, for example, a device shown in FIG. 1 is known. This three-dimensional pointing device allows six ways of operations, i.e., "pushing a central round control knob 150 forward", "pressing the center of the knob 150", "pressing the rear end of the knob 150", "lifting the entire knob upward", "turning the entire knob 150 clockwise", and "turning the entire knob 150 counterclockwise", and has six degrees of freedom.

By assigning these six degrees of freedom to various operation instructions, the position (x, y, z) and directions (x-, y-, and z-axes) of a cursor in a three-dimensional space can be controlled, or the view point position (x, y, z) and directions (x-, y-, and z-axes) with respect to the three-dimensional space can be controlled.

However, when this device is operated actually, the cursor or view point cannot be desirably controlled.

For example, when the operator wants to turn the knob clockwise or counterclockwise, he or she may press its forward or rear end, and the cursor or view point may move in an unexpected direction.

In place of such three-dimensional pointing device, devices that can input instructions using hand or body actions have been developed.

Such devices are called, e.g., a data glove, data suit, cyber glove, and the like. For example, the data glove is a glove-like device, and optical fibers run on its surface. Each optical fiber runs to a joint of each finger, and upon bending the finger, the transmission state of light changes. By measuring the transmission state of light, the bent level of the joint of each finger can be detected. The position of the hand itself in the three-dimensional space is measured by a magnetic sensor attached to the back of the hand. If an action is assigned to a given instruction (e.g., if the index finger is pointed up, a forward movement instruction is issued), the operator can walk in the three-dimensional space by variously changing the view point using the data glove (walkthrough).

However, such device suffers some problems.

First, such device is expensive, and can hardly be used for home use.

Second, operation may often be erroneously recognized. Since the angle of the finger joint is measured, even when, for example, a state wherein the operator stretches only his or her index finger and bends other fingers is defined as a forward movement instruction, such state may be erroneously recognized as another instruction. More specifically, stretching a finger includes various states. That is, since the second joint of the index finger rarely makes 180°, it is different to recognize the stretched state except for such 180° state of the index finger, unless a given margin is assured.

Third, since the operator must wear the data glove, his or her natural movement is disturbed.

Fourth, every time the operator wears the data glove, he or she must calibrate the transmission state of light in correspondence with the stretched and bent finger states, resulting in troublesome operations.

Fifth, a problem of failures remains unsolved. That is, after continuous use of the data glove, failures such as disconnection of fibers may take place, and the data glove has a durability as low as an expendable.

Sixth, despite the fact the data glove is such expensive, troublesome device, if the glove size does not just fit with the operator's hand, the input value may deviate from the calibrated value during use due to slippage of the glove, and delicate hand actions can hardly be recognized.

Owing to various problems described above, the data glove has not so prevailed contrary to initial expectation although it served as a trigger device of the VR (virtual reality) technology. For this reason, the data glove is still expensive, and has many problems in terms of its use.

By contrast, some studies have been made to input hand and body actions without wearing any special devices such as a data glove.

As a typical study for inputting hand or body actions, for example, a method of recognizing hand shape by analyzing a moving image such as a video image is known.

However, in this method, an objective image (in case of hand action recognition, a hand image alone) must be extracted from the background image, but it is very hard to extract the objective image portion.

For example, assume that a "hand" as an objective image is extracted using colors. Since the hand has skin color, only a skin color portion may be extracted. However, if a beige clothing article or wall is present as a background, it is hard to recognize skin color, and such method is far from reality. Even when beige is distinguished from skin color by adjustment, if illumination changes, the color tone also changes. Hence, it is difficult to steadily extract a skin color portion.

In order to avoid such problems, a method that facilitates extraction by imposing a constraint on the background image, e.g., by placing a blue mat on the background may be used. Alternatively, a method that colors finger tips to easily extract them from the background or makes the operator wear color rings may be used. However, such constraints are not practical; they are used for experimental purposes but are not put into practical applications.

The above-mentioned video image recognition such as extraction and the like requires a vary large computation amount. For this reason, existing personal computers cannot process all video images (as large as 30 images per sec) in real time. Hence, it is hard to attain motion capture by video image processing in real time.

As another method of inputting hand or body actions by analyzing a moving image such as a video image, a method using a device called a range finder for inputting a distant image is known.

The typical principle of the range finder is to irradiate an object with spot light or slit light and obtain a distant image based on the position where the light reflected by the object is received by the principle of triangulation. The range finder mechanically scans spot light or slit light to obtain two-dimensional distance information. This device can generate a distant image with very high precision, but requires a large-scale arrangement, resulting in high cost. Also, a long input time is required, and it is difficult for this device to process information in real time.

As still another method of inputting hand or body actions by analyzing a moving image such as a video image, a device for detecting a color marker or light-emitting unit attached to a hand or body portion from an image, and capturing the shape, motion, and the like of the hand or body portion may be used. This device has already been put into some applications. However, the device has a serious demerit of user's inconvenience, since the user must wear the device upon every operation, and the application range is limited very much. As in the example of the data glove, when the user wears the device on his or her movable portion such as a hand, the durability problem is often posed.

As described above, various three-dimensional pointing device systems are available. However, a promising system in the future is presumably the one that analyzes and uses a moving image such as a video image without forcing the operator to wear any device or to operate any device directly.

With a conventional camera technique, in order to synthesize (chromakey) a character with a background, a character image must be photographed in front of a blue back to facilitate character extraction. For this reason, the photographing place is limited to, e.g., a studio that can photograph an image in front of a blue back. Alternatively, in order to extract a character from an image photographed in a non-blue back state, the character extraction range must be manually edited in units of frames, resulting in very cumbersome operations.

Similarly, in order to generate a character in a three-dimensional space, a three-dimensional model is created in advance, and a photograph of the character is pasted to the model (texture mapping). However, creation of a three-dimensional model and texture mapping are tedious operations and are rarely used other than applications such as movie production that justifies extravagant cost needed.

In order to solve these problems, for example, a technique disclosed in U.S. Ser. No. 08/953,667 is known. This technique acquires a distant image by extracting a reflected light image. However, this technique cannot use commercially available sensor arrays.

As described above, in recent years, needs and requirements for three-dimensional inputs are increasing, but no direct-pointing input apparatuses that can easily input a gesture or motion without making the user wear any special devices are available.

Hence, development of a practical, simple three-dimensional input apparatus which can easily attain pointing or a change in view point in a three-dimensional space has been demanded.

BRIEF SUMMARY OF THE INVENTION

It is an object of the present invention to provide a practical three-dimensional information input apparatus which can easily attain pointing or a change in view point in a three-dimensional space, and naturally animate an animation character directly using a user's gesture or motion.

In order to achieve the above object, according to the present invention, an information input apparatus for obtaining a difference image between object images corresponding to irradiated and non-irradiated states, comprises a light emitter for irradiating an object with light, an area image sensor having imaging units constructed by a two-dimensional matrix of a plurality of light-receiving elements that perform photoelectric conversion, and a plurality of CCD type charge transfer sections for transferring and outputting charges obtained by the imaging units, and a controller for controlling charge transfer timings from the light-receiving elements to the CCD type charge transfer sections to alternately arrange charges received when the light emitter emits light and charges received when the light emitter does not emit light in a predetermined sequence in all or the individual CCD type charge transfer sections of the area image sensor.

Further, according to the present invention, an apparatus for obtaining a difference image between object images corresponding to irradiated and non-irradiated states, comprises: a light emitter for irradiating an object with light; an area image sensor having imaging units constructed by a two-dimensional matrix of a plurality of light-receiving elements that perform photoelectric conversion, and a plurality of CCD type charge transfer means for transferring and outputting charges obtained by the imaging units; a controller for controlling charge transfer timings from the light-receiving elements to the CCD type charge transfer means to alternately arrange charges received when the light emitter emits light and charges received when the light emitter does not emit light in a predetermined sequence in all or the individual CCD type charge transfer means of the area image sensor; a delay line for delaying an output signal from the area image sensor by one horizontal scan time; and a difference circuit, one input of which is connected to the delay line, the other input of which is connected to the area image sensor, and which outputs a difference between two input signals.

Further, according to the present invention, an information input apparatus for obtaining a difference image between object images corresponding to irradiated and non-irradiated states, comprises: invisible-radiation emitting section for irradiating an object with invisible radiation; an are image sensor having imaging units constructed by a two-dimensional matrix of a plurality of invisible-radiation-receiving elements which convert invisible radiation into electrical signals, and a plurality of CCD type charge transfer section for transferring and outputting charges obtained by the imaging units; and a controller for controlling charge transfer timings from the invisible-radiation-receiving elements to the CCD type charge transfer section to alternately arrange charges received when the invisible-radiation emitting section emits invisible radiation and charges received when the invisible radiation emitting section does not emit invisible radiation in a predetermined sequence in all or individual CCD type charge transfer section of the area image sensor.

With this arrangement, since an image formed by alternately arranging object image pixels corresponding to emission and non-emission states in units of pixels can be directly acquired from the CCD type area image sensor by controlling the timings of the two-dimensional matrix of light-receiving elements of the CCD type area image sensor, a difference image can be obtained in real time by extracting differences between pixels, and a reflected image of, e.g., a hand can be easily acquired in real time. This can obviate the need for extraction of an object image, which is most difficult in conventional image processing, and bottlenecks application of image processing. Hence, the present invention can easily and stably provide various kinds of image processing, which are difficult to put into practice in conventional methods, with low cost using commercially available components, and can bring about drastic innovations in a broad range of market such as industries, home, entertainment, and the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10A through 10G are views showing an example of signals that control charge transfer in the first embodiment, and operation transition;

DETAILED DESCRIPTION OF THE INVENTION

The embodiments of the present invention will be described hereinafter with reference to the accompanying drawings.

First Embodiment

Figure 1:
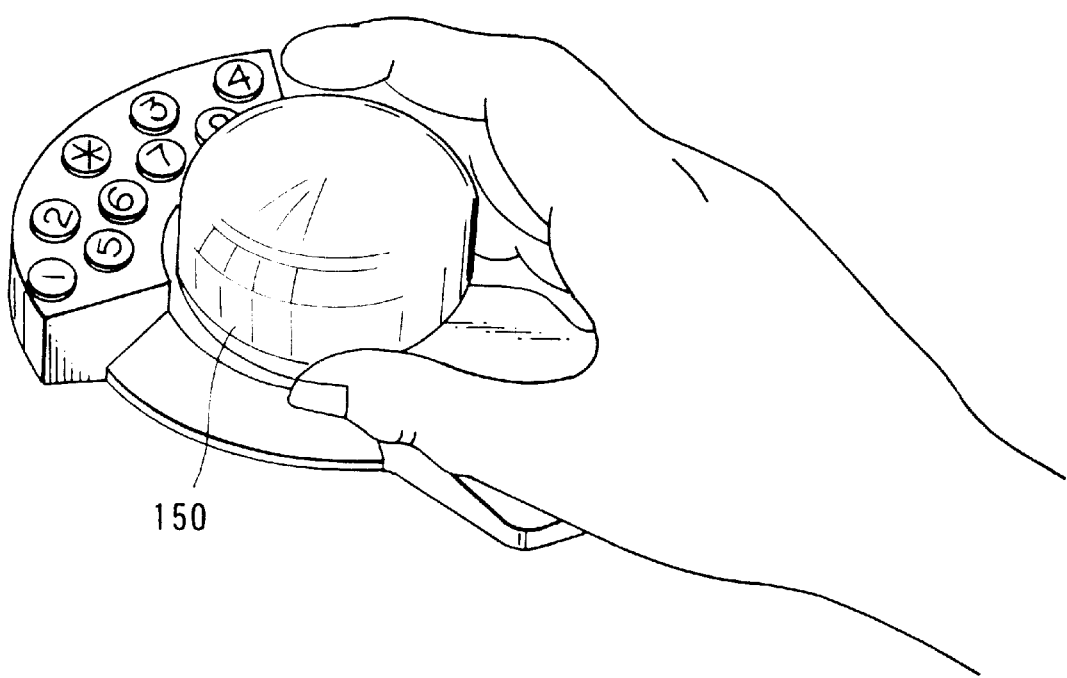
FIG. 1 is a perspective view for explaining the prior art.
Figure 2:
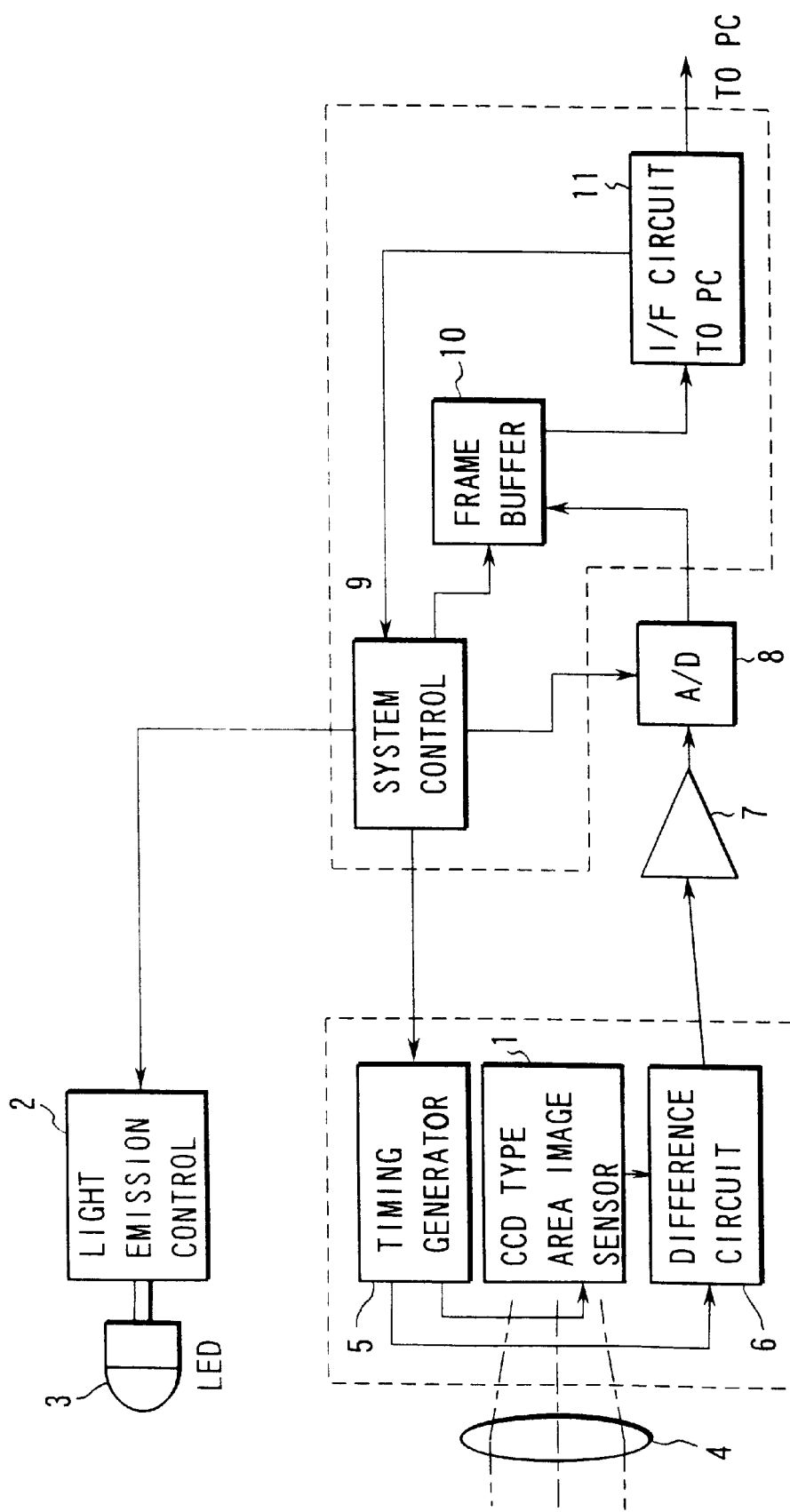
FIG. 2 is a block diagram for explaining an example of the arrangement of the first embodiment of an information input apparatus according to the present invention.

FIG. 2 is a schematic block diagram showing the system arrangement of the first embodiment of an information input apparatus according to the present invention.

Figure 3:
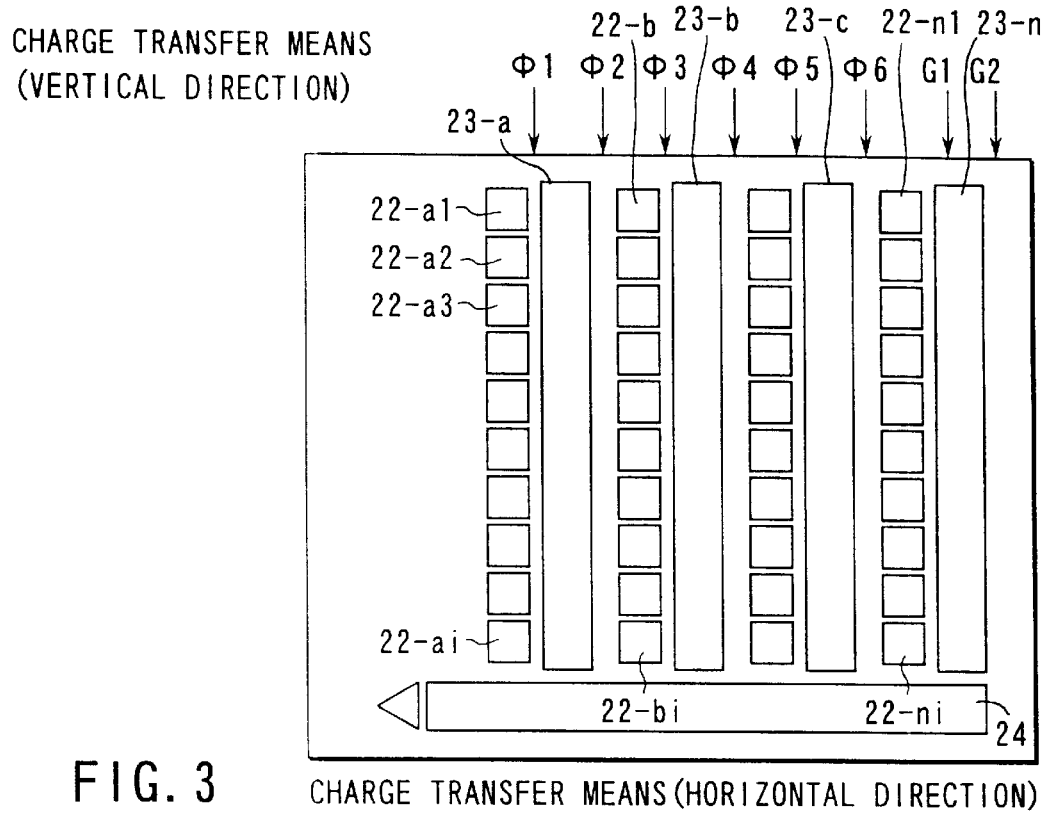
FIG. 3 is a plan view for explaining an example of the arrangement of the first embodiment of the present invention in more detail.

Referring to FIG. 2, the information input apparatus of the present invention comprises an imaging device 1 using a CCD type area image sensor shown in, e.g., FIG. 3, a light emission control means 2, an LED (light-emitting element) 3 serving as a light source, an optical system 4, a timing generator 5, a difference circuit 6, an analog amplifier 7, an analog/digital converter 8, a system controller 9, a frame buffer 10, and an interface circuit 11 with a personal computer.

In this system, a CCD type area image sensor 21 shown in FIG. 3 is used as the imaging device 1 that acquires an image. The CCD type area image sensor 21 has a plurality of light-receiving elements 22-$a1$, ..., 22-$ni$ which regularly line up in the row and column directions, vertical charge transfer means 23-$a$, ..., 23-$n$ for transferring charges from the vertical arrays of light-receiving elements of these light-receiving elements 22-$a1$, ..., 22-$ni$, and a horizontal charge transfer means (image signal output charge transfer means) 24 for reading out charges transferred by the vertical charge transfer means 23-$a$, ..., 23-$n$ in units of lines and horizontally transferring the charges to output them as image signals. Charges obtained by the individual light-receiving elements that form pixels are transferred by the vertical charge transfer means 23-$a$, ..., 23-$n$, and are also transferred by the horizontal charge transfer means 24 serving as the image signal output charge transfer means, thus obtaining image signals in units of lines.

Especially, the CCD area image sensor 21 used in the system of the first embodiment has an element structure that comprises the horizontal charge transfer means 24 having stages (pixels) twice the number of vertical charge transfer means 23-$a$, ..., 23-$n$. Since charge transfer can be controlled in units of odd and even lines, odd lines are used for acquiring, e.g., an image of an object, which is irradiated with illumination light, and even lines are used for acquiring an image of an object which is not irradiated with illumination light. In addition, the vertical charge transfer means 23-$a$, ..., 23-$n$ are controlled to alternately arrange illuminated and non-illuminated image charges, and two pixels (two charges) per vertical charge transfer means (23-$a$, ..., 23-$n$) can be transferred to and held by the horizontal charge transfer means 24 having a capacity capable of holding charges twice the number of lines of the vertical charge transfer means 23-$a$, ..., 23-$n$.

For this purpose, in this system, gates for transferring charges from the individual light-receiving elements to the vertical charge transfer means 23-$a$, ..., 23-$n$ can be individually controlled in units of light-receiving elements. For example, a CCD type area image sensor generally called a progressive CCD type area sensor having the arrangement shown in FIG. 3 is used.

The timing generator 5 generates timing control signals such as pulse signals, modulation signals, or the like. The light-emitting means 3 is a light source that illuminates an object, and is comprised of, e.g., an LED or the like. The light emission control means 2 controls light emission of the light-emitting means 3 in synchronism with timing signals generated by the timing generator 5.

The optical system 4 is a lens for forming an image on the light-receiving surface of the CCD type area image sensor 21 that constructs the imaging device 1 by focusing light emitted by the light-emitting means 3 and reflected by the object.

The difference circuit 6 obtains a difference between an image acquired when the light-emitting means 3 emits light and an image acquired when the means 3 does not emit light, i.e., obtains differences between charges of the light-receiving elements of the individual pixels of the CCD type area image sensor 21 between the emission and non-emission states.

The analog amplifier 7 amplifies a charge signal obtained by the difference circuit 6. The A/D converter 8 converts the charge signal amplified by the analog amplifier 7 into digital data. The frame buffer 10 is a memory for temporarily storing the digital image signal in units of frames.

The interface circuit 11 sends the signal stored in the frame buffer 10 to a processing apparatus main body such as a PC (personal computer). The system control means 9 controls the light emission control means 2, timing generator 5, A/D converter 8, frame buffer 10, interface circuit 11, and the like.

Note that an example of the driving method and the like of the CCD area image sensor 21 is described in detail in, e.g., "Toshiba CCD area sensor data book" or the like. In this embodiment, only details required for explaining the operation of the present invention will be touched upon to allow easy understanding.

Example of Arrangement of CCD Area Image Sensor 21

FIG. 3 is a schematic plan view showing an example of the arrangement of the area image sensor 21. As shown in FIG. 3, the CCD area image sensor 21 comprises the plurality of light-receiving elements $22$-$a1$, $22$-$a2$, $22$-$a3$, ..., $22$-$ai$, ..., $22$-$n1$, $22$-$n2$, $22$-$n3$, ..., $22$-$ni$, vertical charge transfer means $23$-$a$, $23$-$b$, ..., $23$-$n$, and horizontal charge transfer means 24.

Of these components, the light-receiving elements $22$-$a1$, $22$-$a2$, $22$-$a3$, ..., $22$-$ai$, ..., $22$-$n1$, $22$-$n2$, $22$-$n3$, ..., $22$-$ni$ are obtained by regularly arranging photodiodes (PDs) two-dimensionally, i.e., in a matrix, and suffices $a1$, $a2$, $a3$, ..., $ai$, ..., $22$-$n1$, $n2$, $n3$, ..., $ni$ are appended in units of matrix positions to identify the positions of the light-receiving elements. Two different types of charge transfer means, i.e., the vertical charge transfer means $23$-$a$, $23$-$b$, $23$-$c$, ..., $23$-$n$, and horizontal charge transfer means 24, are used, and serve as analog shift registers constructed by CCDs (Charge Coupled Devices).

The vertical charge transfer means $23$-$a$, $23$-$b$, $23$-$c$, ..., $23$-$n$ are placed in correspondence with light-receiving element groups lining up in the vertical direction (Y-axis direction). In this example, the vertical charge transfer means $23$-$a$ is used for transferring charges from the light-receiving elements $22$-$a1$, $22$-$a2$, $22$-$a3$, ..., $22$-$ai$, the vertical charge transfer means $23$-$b$ is used for transferring charges from the light-receiving elements $22$-$b1$, $22$-$b2$, $22$-$b3$, ..., $22$-$bi$, ..., the vertical charge transfer means $23$-$n$ is used for transferring charges from the light-receiving elements $22$-$n1$, $22$-$n2$, $22$-$n3$, ..., $22$-$ni$.

The horizontal charge transfer means 24 receives charges for one stage (for one line, i.e., accumulated charges from one X-axis array of n light-receiving elements) shifted and transferred by these vertical charge transfer means $23$-$a$, $23$-$b$, $23$-$c$, ..., $23$-$n$, and outputs the charge signal as an output of the CCD image sensor 21 to an external device.

In order to drive the CCD image sensor 21 with such arrangement, various types of control signals are required, and are generated by the above-mentioned timing generator 5.

Signals generated by the timing generator 5 and supplied to the CCD image sensor 21 include eight types of signals $\phi1$, $\phi2$, $\phi3$, $\phi4$, $\phi5$, $\phi6$, G1, and G2, as shown in FIG. 3.

Of these signals, the signals $\phi1$, $\phi2$, and $\phi3$ control charge transfer in the vertical direction, the signals $\phi4$, $\phi5$, and $\phi6$ control charge transfer in the horizontal direction, and the signals G1 and G2 control the ON/OFF states of gates that control charge transfer from the light-receiving elements to the charge transfer means. The signal G1 controls odd lines, and the signal G2 controls even lines.

Description of Operation

Figure 8:
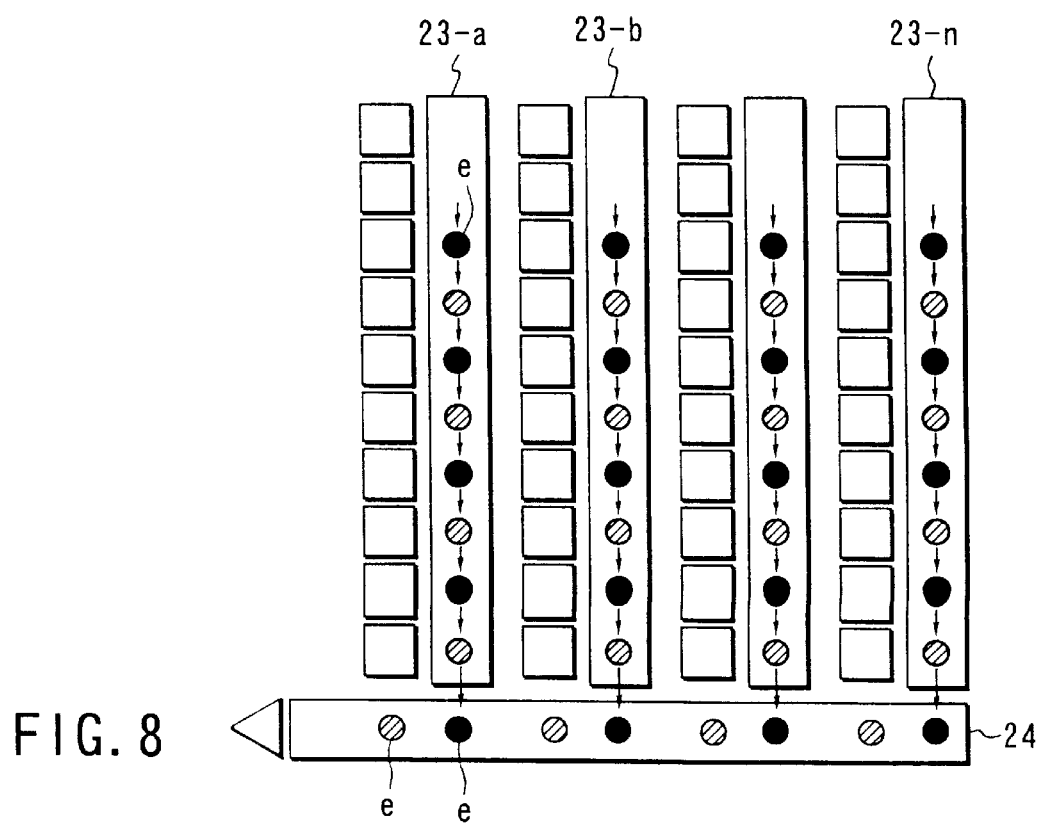
FIG. 8 is a plan view for explaining an example of charge transfer in the first embodiment.
Figure 9:
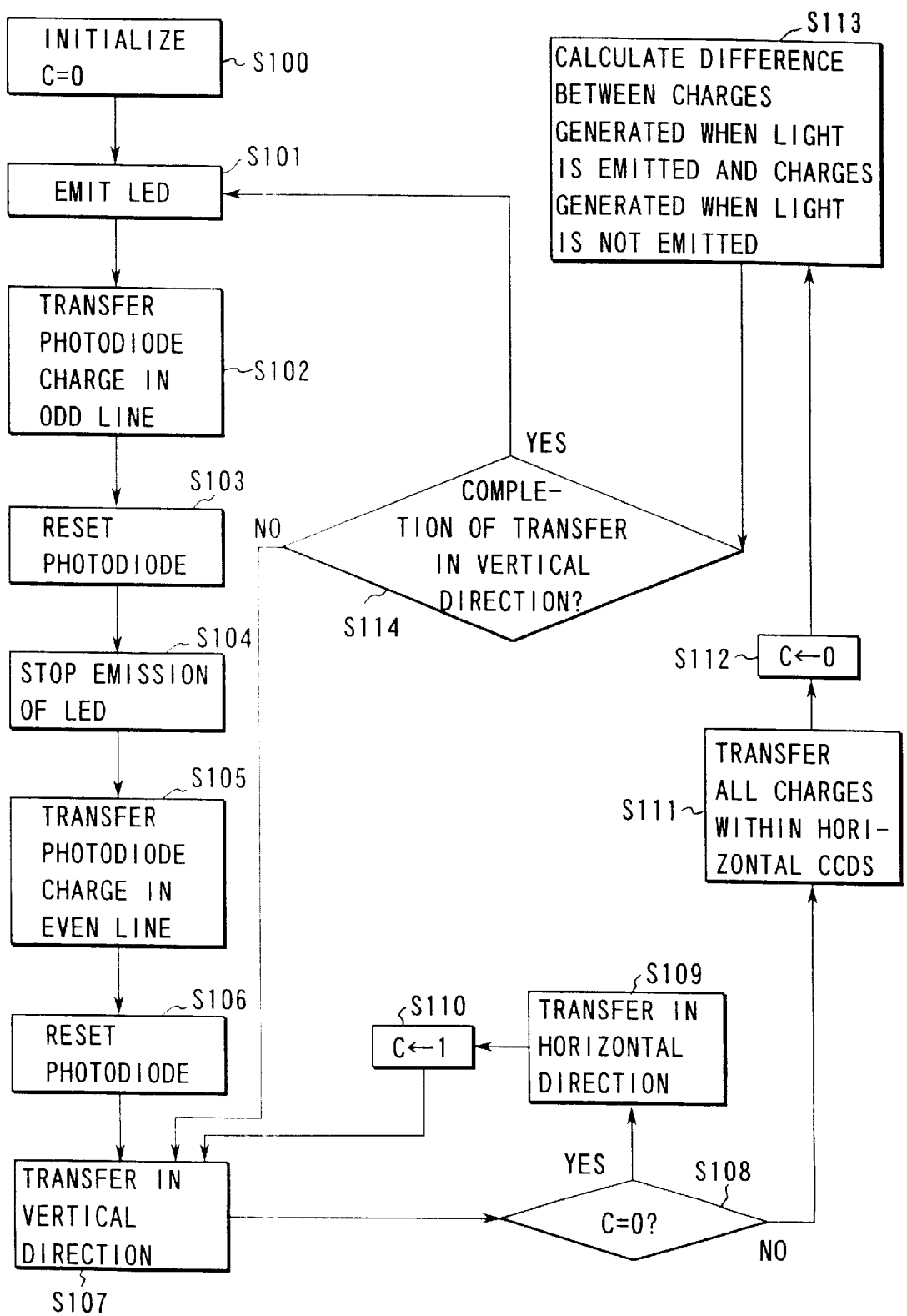
FIG. 9 is a flow chart showing an example of processing flow in the first embodiment.

The operation of the system according to the first embodiment with the above-mentioned arrangement will be explained below with reference to FIGS. 4 through 8. In this system, in order to extract an objective portion image of an object, an object image without any illumination, and an object image obtained by illuminating the object are obtained, and the difference between these images is extracted without using any frame memory or the like, thus extracting a reflected light image of the objective portion. This operation will be explained below. Note that FIG. 9 is a flow chart of the processing.

Prior to the processing, the light-receiving unit of the CCD image sensor 21 constructed by a two-dimensional matrix of light-receiving elements 22 forms i lines in correspondence with television scan lines: the first line made up of a total of n light-receiving elements $22$-$a1$, $22$-$b1$, $22$-$c1$, ..., $22$-$n1$, the second line made up of a total of n light-receiving elements $22$-$a2$, $22$-$b2$, $22$-$c2$, ..., $22$-$n2$, the third line made up of a total of n light-receiving elements $22$-$a3$, $22$-$b3$, $22$-$c3$, ..., $22$-$n3$, ..., the i-th line made up of a total of n light-receiving elements $22$-$ai$, $22$-$bi$, $22$-$ci$, ..., $22$-$ni$. When charges obtained by the light-receiving elements from the first to n-th lines are moved to the vertical charge transfer means $23$-$a$, $23$-$b$, $23$-$c$, ..., $23$-$n$ corresponding to the light-receiving elements, and are transferred stage by stage, charges in units of lines are transferred to the horizontal charge transfer means 24 in the order of i-th line, (i−1)-th line, ..., third line, second line, and first line. At this time, by shifting the horizontal charge transfer means 24, image signals can be output in units of lines.

If i is an odd integer, the i-th line, (i−2)-th line, ..., third line, and first line correspond to odd television scan lines, and the (i−1)-th line, (i−3)-th line, ..., fourth line, and second line correspond to odd television scan lines.

In order to identify whether an image signal output from the horizontal charge transfer means 24 is obtained by reading out an even or odd line, the CCD area image sensor 21 has an output of flag C. On the other hand, in order to clear the contents (held charges) of the light-receiving elements 22, vertical charge transfer means $23$-$a$, $23$-$b$, $23$-$c$, ..., $23$-$n$, and horizontal charge transfer means 24, the image sensor 21 has a clear terminal.

Hence, initialization for supplying a clear signal is executed first to clear flag C and to clear the contents of the light-receiving elements 22, vertical charge transfer means $23$-$a$, $23$-$b$, $23$-$c$, ..., $23$-$n$, and horizontal charge transfer means 24 (step S100).

In order to sense an image of an illuminated object, the light emission control means 2 then controls the light-emitting element (LED) 3 for illuminating the object to emit light (step S101). The emitted light is reflected by the object, is focused by the lens (optical system) 4, and becomes incident on the CCD area image sensor 21 that constructs the imaging unit 1, thus forming an optical image on the two-dimensional matrix of the light-receiving elements 22. The formed optical image is converted into charges proportional to the intensity levels of reflected light by the individual light-receiving elements 22-a1, 22-a2, . . . , 22-ni that form pixels, and the converted charges are accumulated. In this way, charges in units of pixels are obtained at those pixel positions by the light-receiving elements 22-a1, 22-a2, . . . , 22-ni of the CCD area image sensor 21 that construct the imaging unit 1.

By applying a voltage to G1, gates from the light-receiving elements 22-a1, 22-a3, . . . , 22-an, . . . , 22-n1, 22-n3, . . . , 22-ni in odd lines of the light-receiving elements 22-a1, 22-a2, . . . , 22-n1, . . . , 22-ni to the vertical charge transfer means 23-a, 23-b, 23-c, . . . , 23-n are activated.

Figure 4:
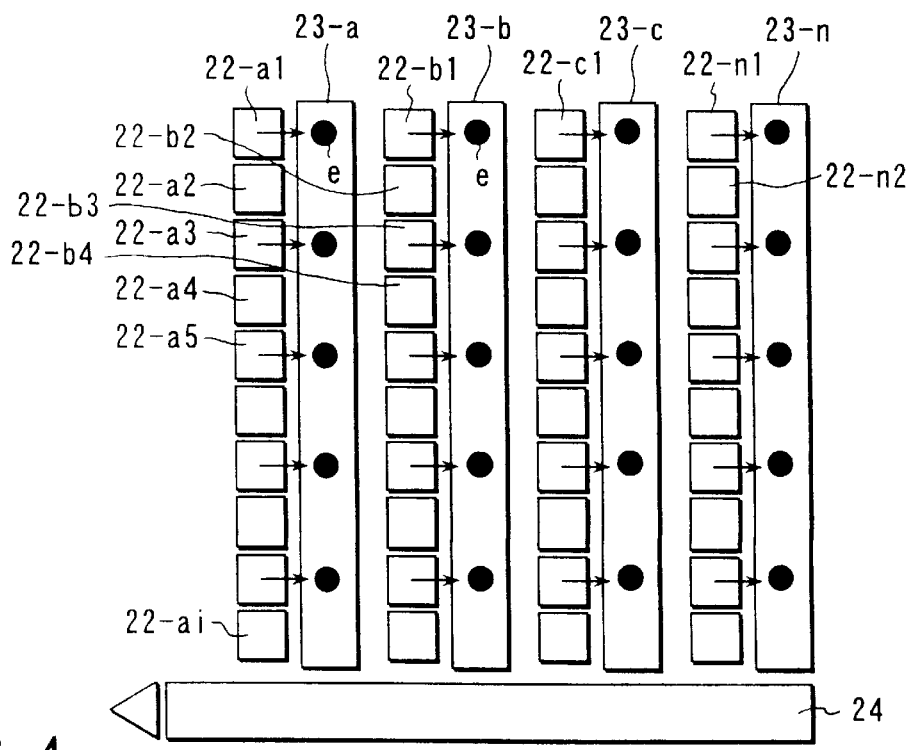
FIG. 4 is a plan view for explaining an example of the arrangement of the first embodiment of the present invention in more detail.

Then, only charges accumulated on the light-receiving elements 22-a1, 22-a3, . . . , 22-an, . . . , 22-n1, 22-n3, . . . , 22-ni in odd lines are transferred to the vertical charge transfer means 23-a, 23-b, 23-c, . . . , 23-n corresponding to these light-receiving elements, as shown in FIG. 4 (step S102). At this time, charges accumulated on the light-receiving elements 22-a2, 22-a4, . . . , 22-an−1, . . . , 22-n2, 22-n4, . . . , 22-ni−1 are not transferred to the vertical charge transfer means 23-a, 23-b, 23-c, . . . , 23-n at all. For this reason, the state at that time is as shown in FIG. 4. Note that e indicates the charge for each pixel.

After that, the light-receiving elements 22-a1, 22-a2, . . . , 22-n1, . . . , 22-ni of the CCD area image sensor 21 are temporarily reset to clear charges accumulated therein (step S103).

In this manner, only the charges accumulated on the light-receiving elements 22-a1, 22-a3, . . . , 22-an, . . . , 22-n1, 22-n3, . . . , 22-ni in odd lines are held by the vertical charge transfer means 23-a, . . . , 23-n. At this time, the even line positions of the vertical charge transfer means 23-a, . . . , 23-n are empty.

Next, in order to sense an image of the object without any illumination, the light emission control means 2 stops light emission of the light-emitting element (LED) 3 (step S104). In order to transfer only charges accumulated on the light-receiving elements 22-a2, 22-a4, . . . , 22-an−1, . . . , 22-n2, 22-n4, . . . , 22-ni−1 in even lines to the vertical charge transfer means 23-a, 23-b, 23-c, . . . , 23-n in turn, a voltage is applied to G2. In this way, the gates to the vertical charge transfer means 23-a, 23-b, 23-c, . . . , 23-n are activated.

Figure 5:
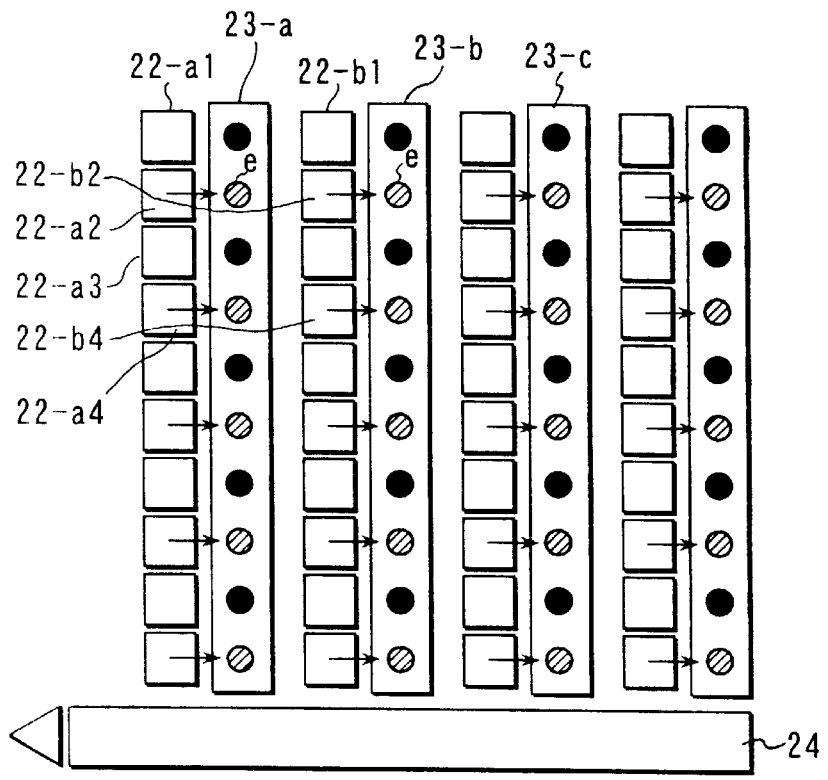
FIG. 5 is a plan view for explaining the first embodiment of the present invention.

As a result, as shown in FIG. 5, accumulated charges obtained in a non-illuminated state are transferred from the light-receiving elements 22-a2, 22-a4, . . . , 22-an−1, . . . , 22-n2, 22-n4, . . . , 22-ni−1 in even lines to the corresponding vertical charge transfer means 23-a, 23-b, 23-c, . . . , 23-n (step S105).

In this way, the charges are moved from the light-receiving elements of even lines to the corresponding empty even line positions of the vertical charge transfer means 23-a, . . . , 23-n. As can be seen from FIG. 5, in this state, charges proportional to the intensity levels of reflected light in the emission and non-emission states are alternately accumulated in the vertical charge transfer means 23-a, 23-b, 23-c, . . . , 23-n.

Figure 6:
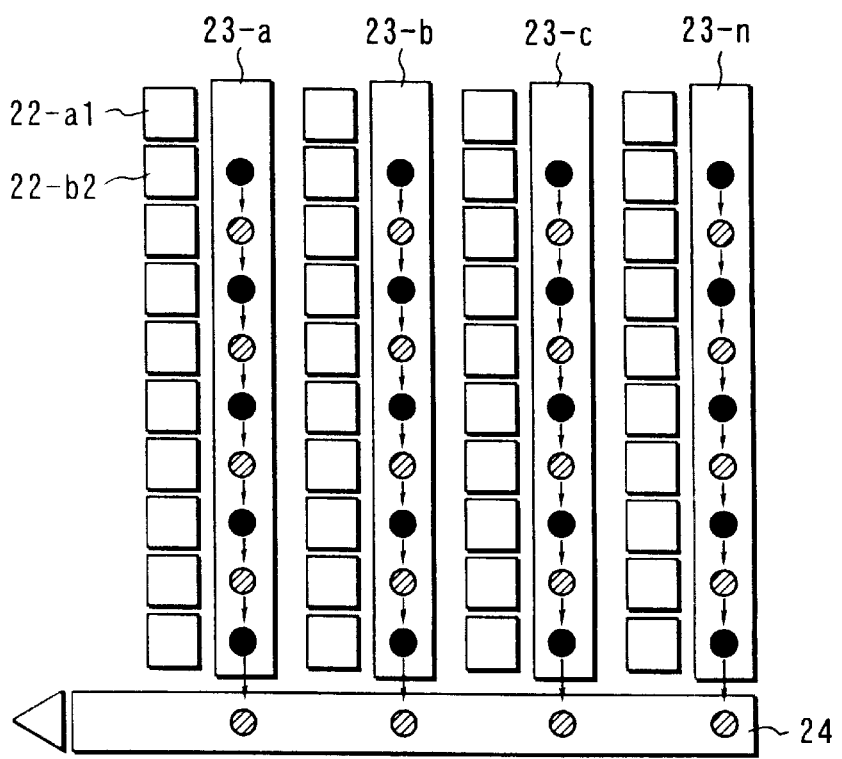
FIG. 6 is a plan view for explaining the first embodiment of the present invention.

The charges accumulated on the vertical charge transfer means 23-a, 23-b, 23-c, . . . , 23-n are transferred by one stage (shifted by one pixel) (step S107). This transfer is attained by applying voltages to φ1, φ2, and φ3, as shown in FIGS. 10A through 10G. In this example, the charges in the non-emission state accumulated on the lowermost stage in FIG. 5 are transferred to the horizontal charge transfer means 24, and are accumulated, as shown in FIG. 6.

It is then checked if an even line has already been read out. That is, if flag C is "0", it is not set to indicate that the even line has been read out. Hence, before the read-out, the charges accumulated in the horizontal charge transfer means 24 are transferred by applying voltages to φ4, φ5, and φ6 (step S109).

Figure 7:
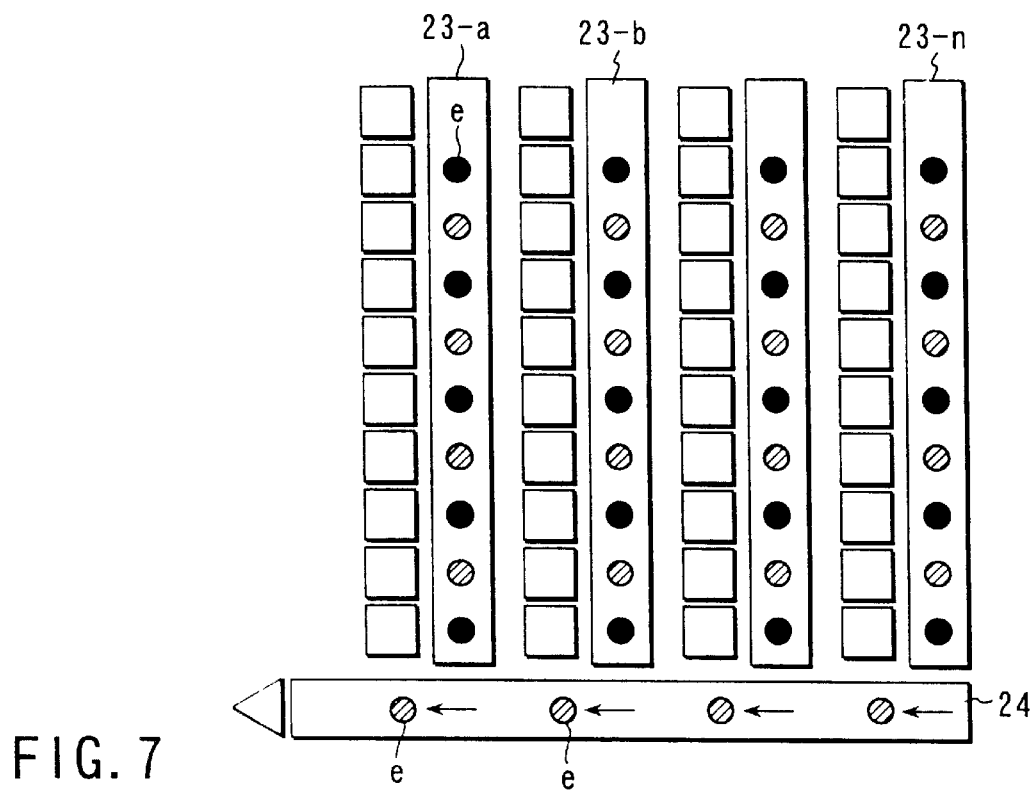
FIG. 7 is a plan view for explaining the first embodiment of the present invention.

At this time, as shown in FIG. 7, the charges in the non-emission state are accumulated at positions shifted to the left by one stage. Since the even line has been read out currently, flag C is set to indicate it (step S110).

After the flag is set, the charges in the vertical charge transfer means 23-a, 23-b, 23-c, . . . , 23-n are transferred by one stage (step S107). Consequently, the charges in the emission and non-emission states are alternately accumulated on the horizontal charge transfer means 24, as shown in FIG. 8.

At this time, since the even line charges have already been read out to the horizontal charge transfer means 24, all the charges accumulated on the horizontal charge transfer means 24 are shifted and output (step S111). After the charges are output, flag C is reset to "0" (step S112).

In this manner, in the vertical charge transfer means 23-a, 23-b, 23-c, . . . , 23-n, the charges in the respective lines are shifted to the horizontal charge transfer means 24 stage by stage, and the horizontal charge transfer means 24 shifts the charges in units of lines received from these vertical charge transfer means 23-a, 23-b, 23-c, . . . , 23-n and outputs them as image signals.

The image signal for each line obtained from the horizontal charge transfer means 24 is defined by alternately arranging pixels in the emission and non-emission states. The individual pixels correspond to neighboring positions when viewed from the image and their distance difference is very small. When the difference is calculated between neighboring pixels, a difference image between the emission and non-emission states is obtained in practice.

Since the CCD area image sensor 21 used in this system has an element structure that comprises the horizontal charge transfer means 24 having stages twice the number of stages of vertical charge transfer means 23-a, 23-b, 23-c, . . . , 23-n, i.e., having stages twice the number of pixels that can be held by the vertical charge transfer means 23-a, 23-b, 23-c, . . . , 23-n, charges for two lines, i.e., for one odd line and one even line are alternately transferred to and held by the single horizontal charge transfer means 24 in units of pixels.

The difference between the charges in the emission and non-emission states is calculated by the difference circuit 6 (step S113).

Charges are accumulated until all the charges accumulated in the vertical charge transfer means have been transferred (step S114).

More specifically, since the vertical charge transfer means 23-a, 23-b, 23-c, . . . , 23-n hold charges of an odd line image as an illuminated image, and charges of an even line image as a non-illuminated image, which are arranged at alternate positions, the charges in these lines are shifted by one stage (one pixel) to the horizontal charge transfer means 24 as the image signal output charge transfer means, and the horizontal charge transfer means 24 shifts the charges and outputs them as an image signal every time it receives the charges for two stages from these vertical charge transfer means 23-a, 23-b, 23-c, . . . , 23-n.

In this manner, light reflected by objects other than the principal object can be accumulated on an even line image as charges in the non-emission state. When these charges are subtracted from the odd line image as charges in the emission state, only reflected light from the principal object can be purely extracted. For example, reflected light shown in FIG. 11 can be extracted. Light components reflected by portions close to the input apparatus have higher intensity, and the intensity of reflected light is inversely proportional to the square of distance.

Hence, this relationship is expressed by:

$$Rij = K/d^2 \qquad (1)$$

where K is a coefficient which is adjusted to, e.g., yield Rij="255" when d=0.5 m.

Hence, solving equation (1) for d yields distance. That is, by extracting the reflected light, a distant image can be extracted.

Then, the flow returns to step S101 to repeat acquisition of reflected light. If acquisition is repeated 30 times per sec, 30 reflected images (distant images) can be extracted per sec.

Since the conventional image processing can extract only ⅙ reflected images (distant images) or less per sec, the performance of the system of the present invention can be improved 180 times (30/(⅙)=180). Upon simply comparing the system cost, the cost can be reduced to "⅙":"30" or ¹⁄₁₈₀ or less. Also, since a CCD type area sensor is used and the present invention is applied to its read-out control, it is very likely that a practical system will be realized, assuring high feasibility of system implementation.

Effect of First Embodiment

According to the first embodiment mentioned above, a reflected image of a hand or the like can be easily acquired in real time. This can obviate the need for extraction of an object image, which is most difficult in conventional image processing, and bottlenecks application of image processing. Hence, the present invention can easily and stably provide various kinds of image processing, which are hard to put into practice in conventional methods, with low cost using commercially available components, and can bring about drastic innovations in a broad range of market such as industries, home, entertainment, and the like.

Modification of First Embodiment

In the first embodiment described above, the horizontal charge transfer means 24 shifts the charges stage by stage, accumulates a sequence of charges in the emission and non-emission states, and transfers them to the difference circuit. However, the present invention is not limited to such specific arrangement.

For example, a CCD type area image sensor having horizontal charge transfer means 24 for two stages (two sets) may be used. In case of the CCD type area image sensor having two stages of the horizontal charge transfer means, charges in the non-emission states are accumulated on the upper horizontal charge transfer means 24.

Figure 12:
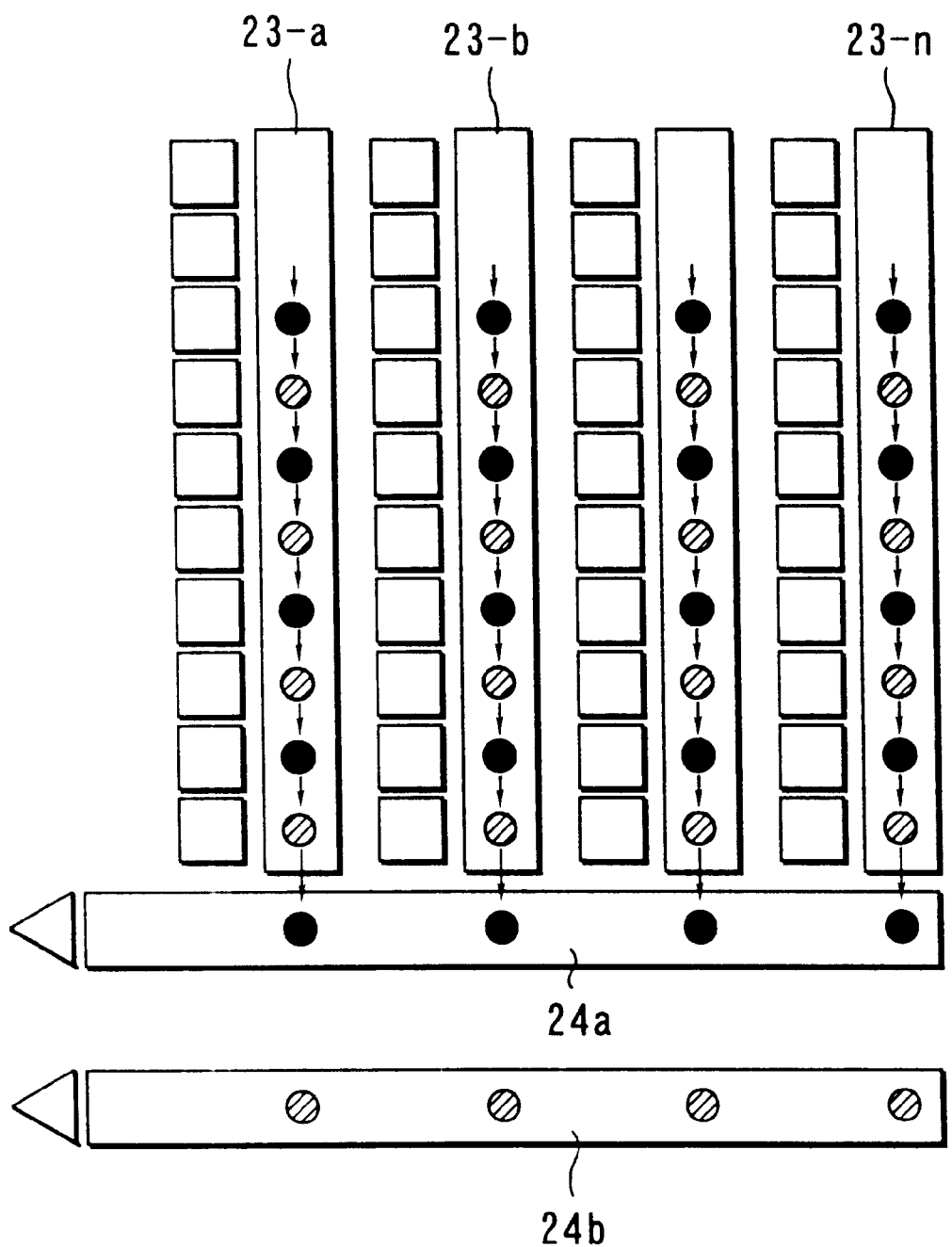
FIG. 12 is a plan view showing an example of charge transfer in a modification of the first embodiment.

At the next transfer timing, these charges in the non-emission states are transferred to the lower horizontal charge transfer means 24, and charges in the emission state are then transferred from the vertical charge transfer means 23-a, 23-b, . . . , 23n. In this manner, the charges in the emission and non-emission states are respectively accumulated on the upper and lower horizontal charge transfer means 24a and 24b, as shown in FIG. 12. The difference between these charges can be calculated by the difference circuit 6.

Or the horizontal charge transfer means 24 for one stage may be used and may transfer charges in units of lines. In this case, the means 24 transfers charges for one line in the non-emission state to the difference circuit 6, and then transfers charges in the emission state.

Alternatively, a delay element for one line may be connected to the output of the CCD area image sensor. In this case, when charges for one line in the non-emission state are input to this delay element, and charges for the next line in the emission state are output without the intervention of the delay element, the outputs in the non-emission and emission states can be simultaneously obtained. These outputs can be input to the difference circuit 6 to obtain a difference output.

Figure 13:
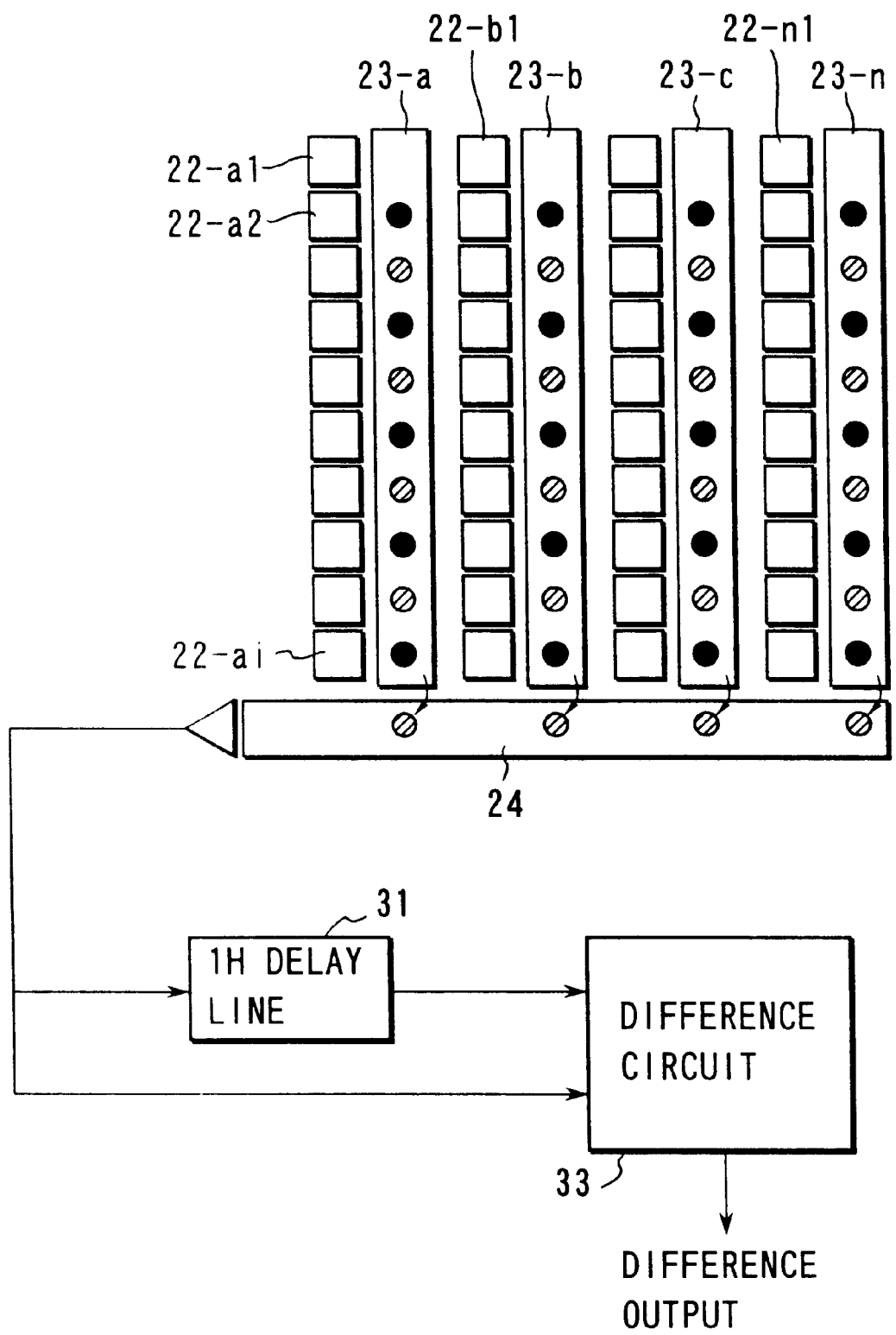
FIGS. 13 through 15 are plan views showing modifications of the first embodiment.
Figure 14:
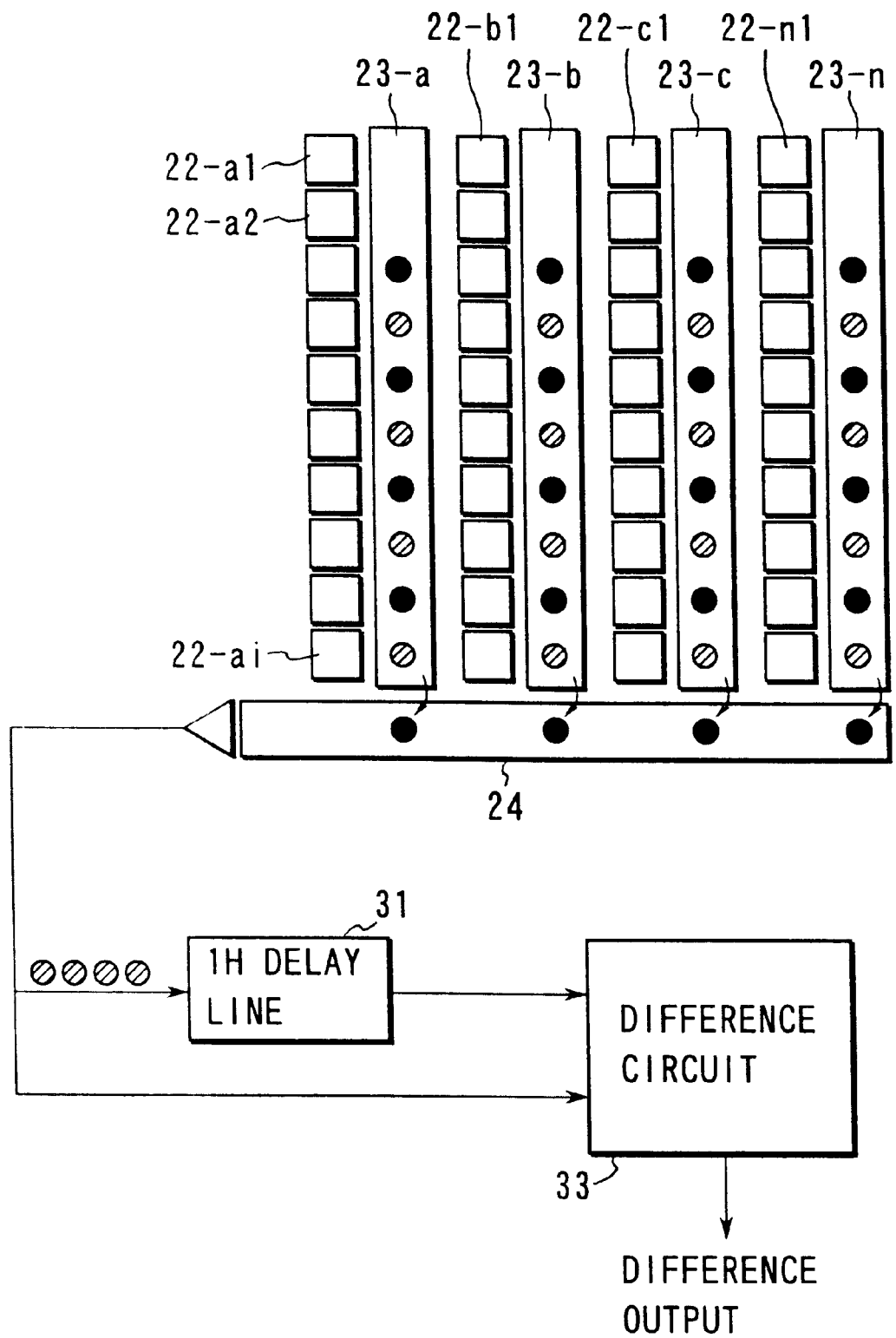
Figure 15:
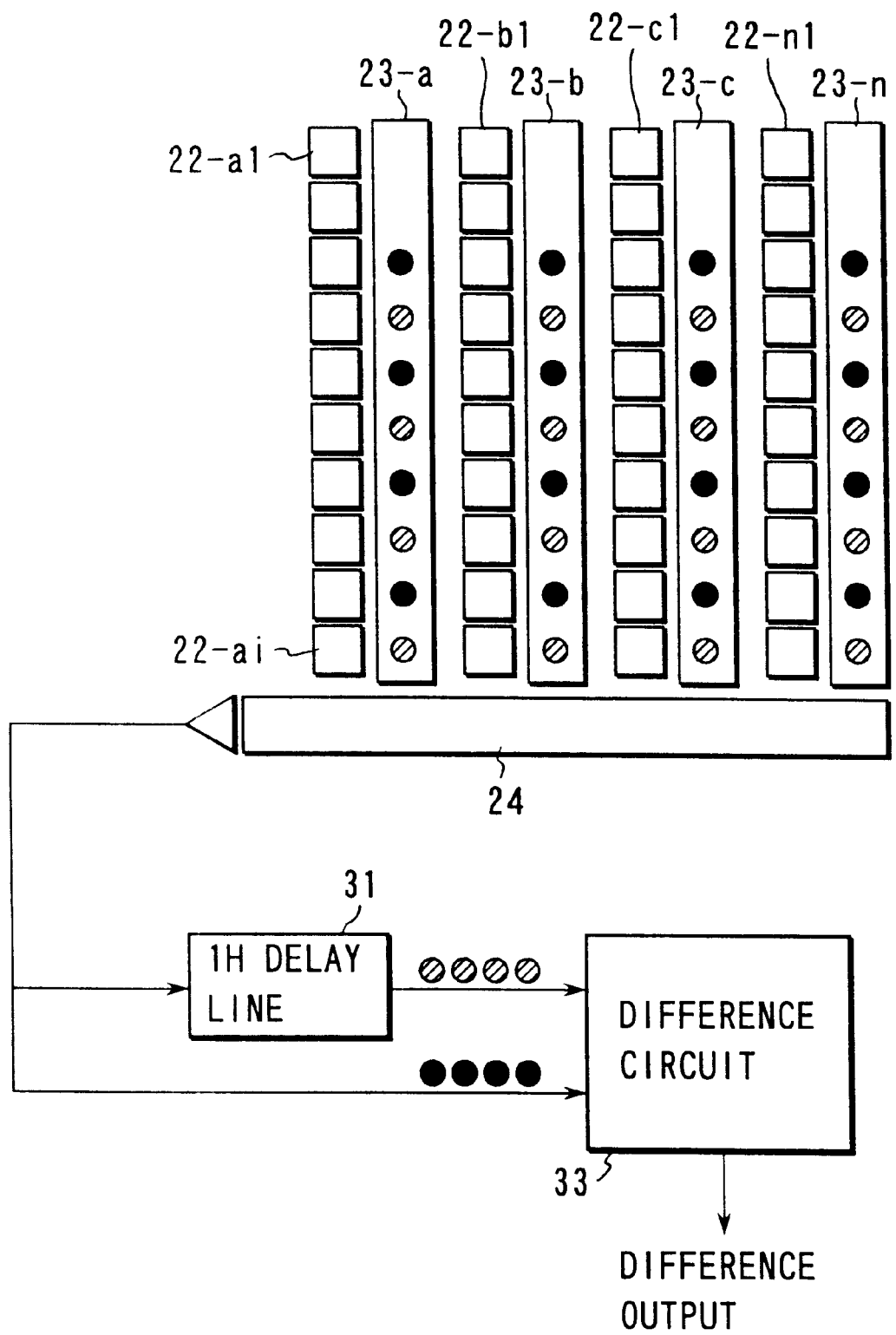

Referring to FIG. 13, charges in the non-emission state input to the horizontal charge transfer means (CCD) are input to a 1H delay line 31 after they are output. The 1H delay line 31 gives a time delay for 1H (one horizontal scan period) between the input and output signals. Referring to FIG. 14, charges input to the horizontal CCD in the emission state are directly input to a difference circuit 33 after they are output. Hence, as shown in FIG. 15, since signals obtained via the 1H delay line in the non-emission state, and signals in the emission state directly input to the difference circuit 33 are simultaneously input to the difference circuit 33, the difference circuit 33 need not have any image buffer or the like. Since a typical CCD type image sensor has only one horizontal CCD, this arrangement can more easily realize the system. Whether or not signals output from the CCD are supplied to the delay line 31 or directly to the difference circuit 33 is determined by a switch means (not shown), which is controlled by the timing generator.

In the first embodiment, even and odd lines are respectively assigned to pixels for extracting images obtained in the emission and non-emission states respectively. However, the present invention is not limited to such specific arrangement. Also, in order to improve precision, lines twice those for accumulating charges in the non-emission state may be used for accumulating charges in the emission state.

Second Embodiment

The second embodiment has the same arrangement as in the first embodiment. However, a CCD type area image sensor used in this embodiment uses a different charge transfer method between the light-receiving elements and vertical charge transfer means 23-a, 23-b, . . . , 23-n.

In the first embodiment, of the control signals generated by the timing generator 5, the signal G1 controls the ON/OFF states of the gates used in charge transfer from the light-receiving elements 22 in odd lines to the vertical charge transfer means 23, and the signal G2 controls the ON/OFF states of the gates for even lines. Charges converted/accumulated by the individual light-receiving elements 22 are transferred to the corresponding positions of the corresponding vertical charge transfer means 23.

By contrast, the second embodiment uses an area image sensor having a gate arrangement in which charges converted/accumulated by pairs of neighboring light-receiving elements 22 are transferred to identical vertical charge transfer means 23-a, 23-b, . . . , 23-n irrespective of even or odd lines.

Figure 16:
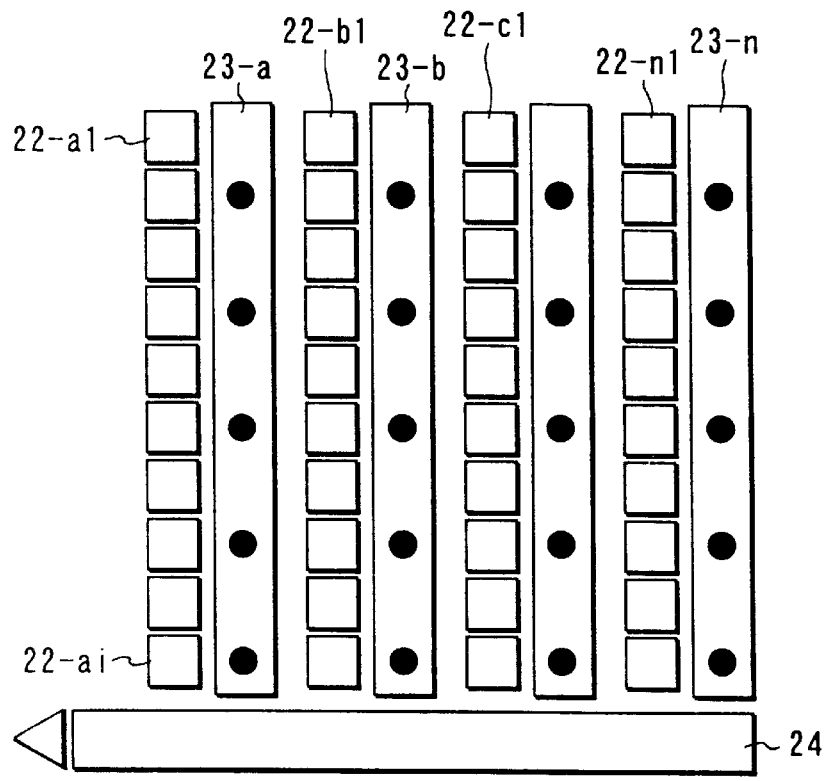
FIG. 16 is a plan view for explaining the first embodiment of the present invention.
Figure 17:
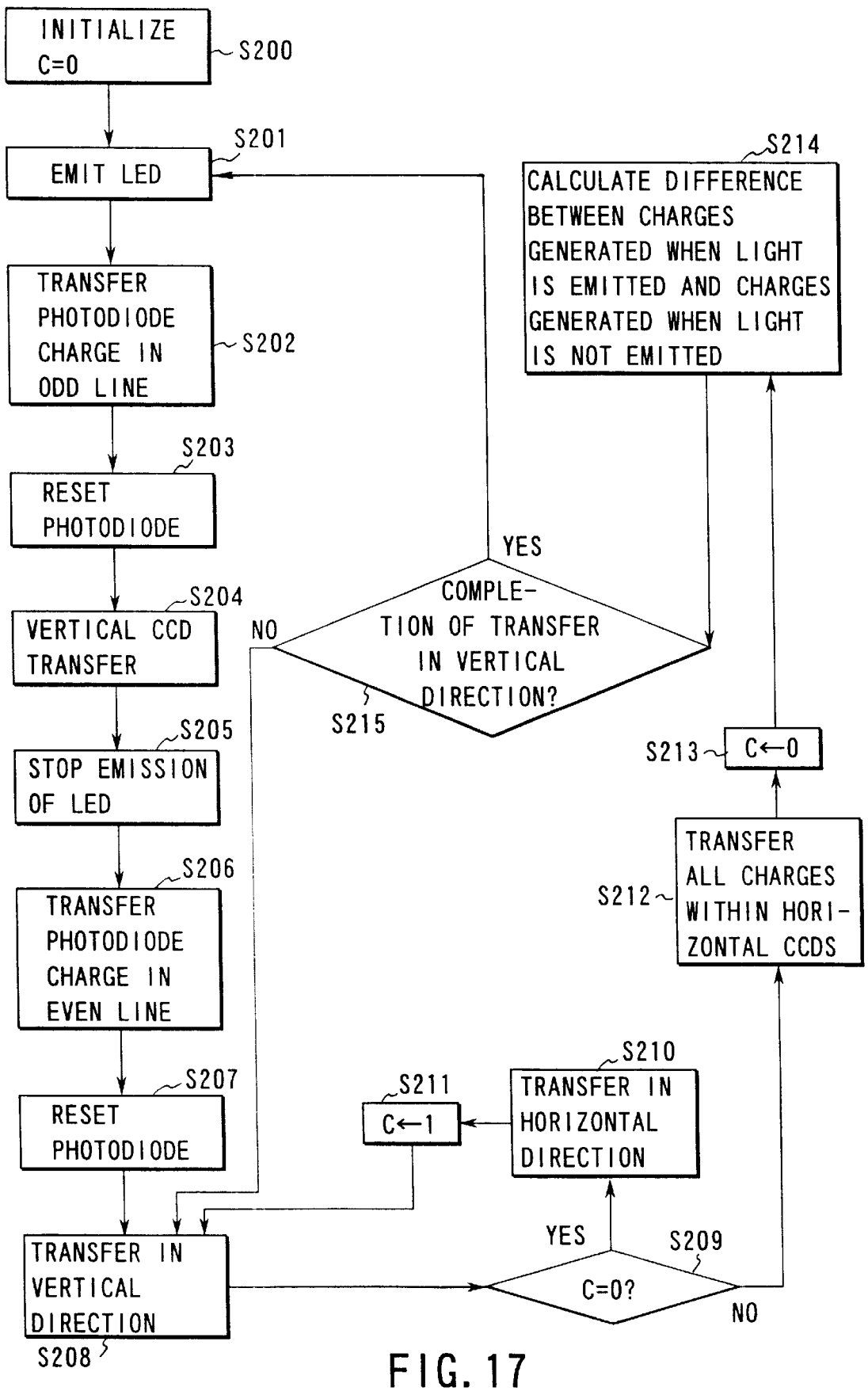
FIG. 17 is a flow chart showing an example of processing flow in the second embodiment of the present invention.

FIG. 16 shows an example of charge accumulation in such area image sensor, and FIG. 17 is a flow chart showing the processing. The flow chart shown in FIG. 17 is substantially the same as that in FIG. 9, except that processing in step S204 is added. More specifically, in step S202, a voltage is applied to G1 to open the corresponding gates, so as to transfer charges from the light-receiving elements 22-$a$1, 22-$a$3, ..., 22-$an$, ..., 22-$n$1, 22-$n$3, ..., 22-$ni$ to the vertical charge transfer means 23-$a$, 23-$b$, ..., 23-$n$.

At this time, the charges are accumulated on the vertical charge transfer means 23-$a$, 23-$b$, ..., 23-$n$ as in FIG. 4.

After the light-receiving elements (PDs) 22-$a$1, 22-$a$2, ..., 22-$n$1, ..., 22-$ni$ that form pixels are reset (step S203), the charges accumulated on the vertical charge transfer means 23-$a$, 23-$b$, ..., 23-$n$ are shifted downward by one stage in step S204. Then, the vertical charge transfer means 23-$a$, 23-$b$, ..., 23-$n$ accumulate and hold the charges, as shown in FIG. 16. More specifically, the odd line positions become empty, and charges are located at the even line positions.

Subsequently, the light-emitting element 3 is controlled to stop light emission (step S205), and a voltage is applied to G2 to open the corresponding gates, thus transferring the received charges from the odd lines to the vertical charge transfer means 23-$a$, 23-$b$, 23-$c$, ..., 23-$n$ (step S206).

Figure 18:
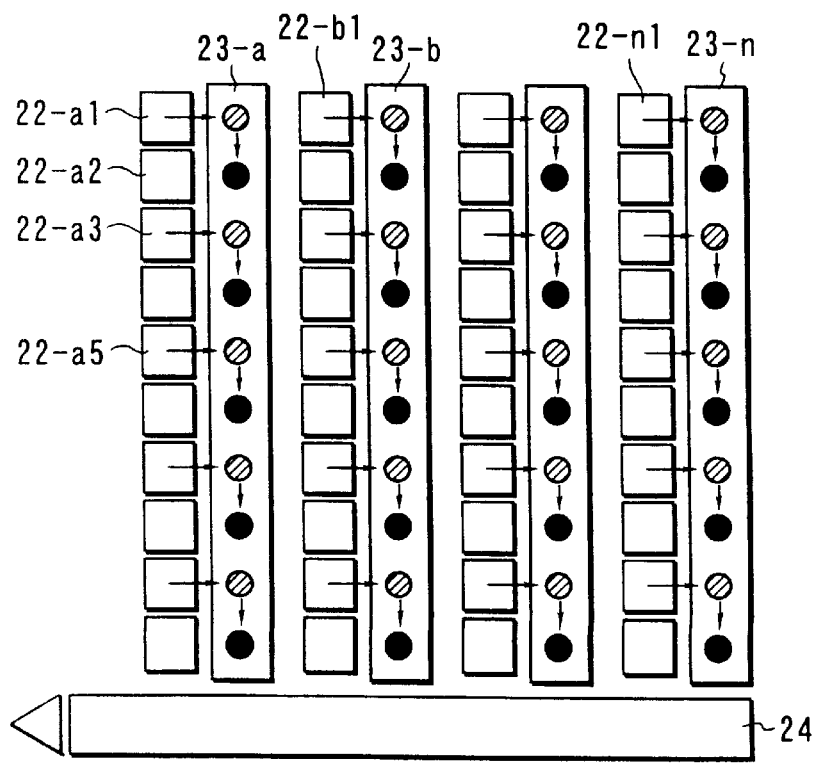
FIG. 18 is a plan view showing an example of charge transfer in the second embodiment.

As a result, charges are accumulated on the vertical charge transfer means 23-$a$, 23-$b$, 23-$c$, 23-$n$, as shown in FIG. 18. After that, the charges are transferred to the horizontal charge transfer means 24 as in the first embodiment, and differences are calculated, thus obtaining a reflected image (distant image).

Effect of Second Embodiment

According to the second embodiment, since light components in the emission and non-emission states are received by identical light-receiving elements (PDs), a high-precision reflected image (distant image) can be acquired without being influenced by characteristic nonuniformity and the like of the light-emitting element, thus providing great practical effects.

Modification of Second Embodiment

As for the arrangement of the horizontal charge transfer means 24, a plurality of means 24 may be used as in the first embodiment.

Also, the second embodiment uses only the light-receiving elements 22-$a$1, 22-$a$3, ..., 22-$an$, ..., 22-$n$1, 22-$n$3, ..., 22-$ni$ in odd lines. For this reason, band-pass filters that can pass light components in the near infrared wavelength range are provided to the light-receiving surfaces of these light-receiving elements 22-$a$1, 22-$a$3, ..., 22-$an$, ..., 22-$n$1, 22-$n$3, ..., 22-$ni$ in odd lines, so that only the light-receiving elements 22-$a$1, 22-$a$3, ..., 22-$an$, ..., 22-$n$1, 22-$n$3, ..., 22-$ni$ in odd lines can receive light emitted by the light-emitting element.

Then, color filters are provided to the light-receiving surfaces of the remaining light-receiving elements 22-$a$2, 22-$a$4, ..., 22-$an$–1, ..., 22-$n$2, 22-$n$4, ..., 22-$ni$–1 in even lines, so that the light-receiving elements 22-$a$2, 22-$a$4, ..., 22-$an$–1, ..., 22-$n$2, 22-$n$4, ..., 22-$ni$–1 can sense a normal color image. Hence, by selectively using the odd and even lines, both a color image and distant image can be sensed by a single input apparatus.

In this way, since a chromakey camera or the like can be realized, the practical effect of this modification is great.

Various embodiments of the present invention have been described. To summarize, in order to obtain a light reflected image of an object from a difference image between object images corresponding to irradiated and non-irradiated states so as to obtain a distant image, the present invention comprises light-emitting means for irradiating an object with light, an area image sensor having imaging units constructed by a two-dimensional matrix of a plurality of light-receiving elements that perform photoelectric conversion, and CCD type charge transfer means for transferring and outputting charges obtained by these imaging units, and timing signal generation means for controlling driving of the CCD type charge transfer means of the area image sensor and charge transfer timings from the light-receiving elements to the CCD type charge transfer means, and controlling to alternately arrange charges received when the light-emitting means emits light and charges received when the light-emitting means does not emit light in a predetermined sequence in all or the individual CCD type charge transfer means of the area image sensor.

With this arrangement, since an image in which object image pixels in emission and non-emission states are alternately arranged in units of pixels can be directly acquired from the CCD type area image sensor by controlling the timings of the two-dimensional matrix of the light-receiving elements of the CCD type area image sensor, a difference image can be obtained in real time by extracting differences between pixels, and a reflected image of, e.g., a hand can be easily acquired in real time. This can obviate the need for extraction of an object image, which is most difficult in conventional image processing, and bottlenecks application of image processing. Hence, the present invention can easily and stably provide various kinds of image processing, which are hard to put into practice in conventional methods, with low cost using commercially available components, and can bring about drastic innovations in a broad range of market such as industries, home, entertainment, and the like. In addition, pointing or a change in view point in the three-dimensional space can be easily done, and an animation character can be naturally animated by directly using a user's gesture or motion.

Figure 11:
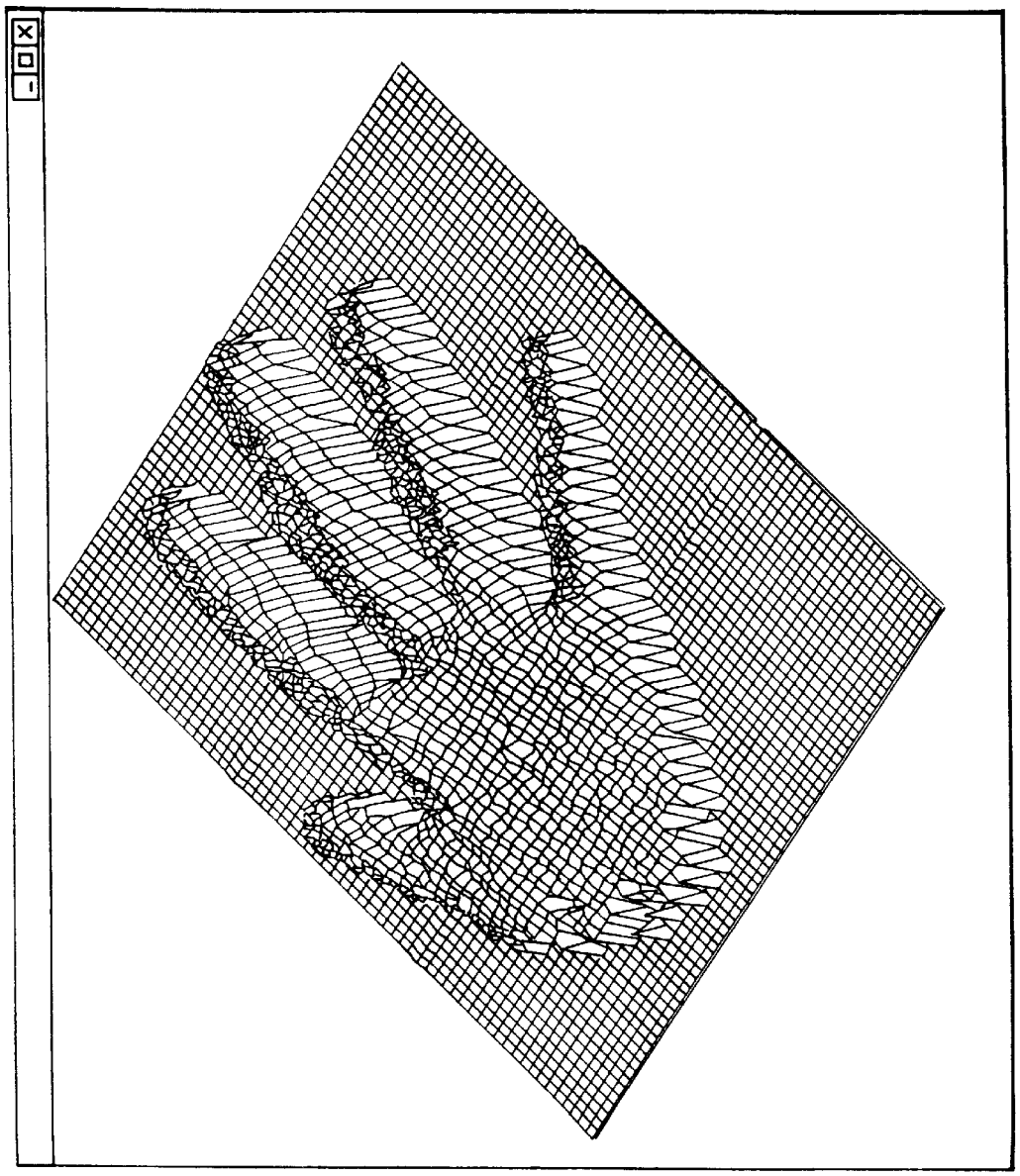
FIG. 11 is a view showing an example of a reflected image acquired in the first embodiment.

In the CCD charge transfer means in the CCD type area image sensor, charges corresponding to the emission and non-emission states are arranged in a predetermined sequence. A difference circuit acquires differences between these charges to extract only reflected components of light emitted by the light-emitting means. Since a typical CCD type area image sensor has no difference circuit, the difference circuit is normally connected to the output side of the CCD type image sensor. However, a CCD type image sensor with a built-in difference circuit may be used. Depending on the arrangement of the CCD type charge transfer means of the CCD type area image sensor, signals to be output have different patterns. When the corresponding two outputs (i.e., the outputs the difference therebetween is to be calculated) are alternately output, as shown in FIG. 7, the difference circuit is simple. The first signal is clamped by a sample & hold circuit or the like, and the difference can be calculated when the next signal is input. The difference calculation can be easily implemented by a differential amplifier or the like. When the two corresponding signals are simultaneously output, as shown in FIG. 11, the difference output can also be easily obtained. When the corresponding two signals are alternately output in units of lines, as shown in FIG. 15, the difference circuit is slightly complicated. When the first signal is delayed using a delay line, as shown in FIG. 15, the two corresponding signals are simultaneously input to the difference circuit. Alternatively, the difference circuit may include a buffer for one line.

In the above embodiment, the difference is calculated before the signal is converted into a digital signal by the A/D converter. For example, the difference may be calculated after the output signals are converted into digital signals by the A/D converter. However, in this case, the difference calculation is done at the cost of dynamic range. For example, assuming that the output in the non-emission state has a level around ¾ that in the emission state, if these outputs are converted into digital signals by a 10-bit A/D converter, and the differences between these digital signals are then calculated, the dynamic range decreases by 2 bits. Such decrease in dynamic range readily occurs when the output in the non-emission state is relatively large. In such case, a merit obtained upon calculating the difference before A/D conversion is large. When the difference is calculated after A/D conversion, if an image buffer for one frame is assured, the present invention can be implemented without arranging charges in a special sequence in the CCD type charge transfer means of the area image sensor, as described in the above embodiment. However, in addition to the decrease in dynamic range, a large image buffer for one frame must be prepared, and the calculation cost after A/D conversion increases. Images in emission and non-emission states are output in turn in units of frames or fields. These two imaging processes have a time interval around 1/60 sec, and the image blurs if a fast motion is sensed. However, the method of the above embodiment is free from such problem since both images in the emission and non-emission states can be sensed at very short time intervals.

Note that the present invention is not limited to the above-mentioned embodiments, and various modifications may be made.

For example, an LED 3, a light emission control means 2 and an optical system 4 are used in the above embodiments. However, an invisible radiation such as infrared, ultraviolet, X-ray and ultrasonic may be used in place of the light.

Furthermore, an area image sensor comprised of a plurality of light-receiving elements is used in the above embodiments. However, an invisible radiation image sensor such as an infrared image sensor, a ultraviolet image sensor, a X-ray image sensor, and a ultrasonic image sensor may be used in place of the light-receiving type image sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for obtaining a difference image between object images corresponding to irradiated and non-irradiated states, comprising:

a light emitter configured to irradiate an object with light;

an area image sensor having imaging units constructed by a two-dimensional matrix of a plurality of light-receiving elements that perform photoelectric conversion, and a plurality of Charge Coupled Device (CCD) type charge transfer sections for transferring and outputting charges obtained by said imaging units;

a controller configured to control charge transfer timings from the light-receiving elements to said CCD type charge transfer sections to alternately arrange charges received when said light emitter emits light and charges received when said light emitter does not emit light in a predetermined sequence in all or the individual CCD type charge transfer section of said area image sensor;

a delay line configured to delay an output signal from said area image sensor by one horizontal scan time; and a difference circuit, one input of which is connected to said delay line, the other input of which is connected to said area image sensor, and which outputs a difference between two input signals.

2. The apparatus according to claim 1, wherein the difference output is obtained by inputting a sequence of charges of the object image corresponding to the non-irradiated state output from said area image sensor to said delay line, and directly inputting a sequence of charges of the object image corresponding to the irradiated state to said difference circuit without intervention of said delay line.

3. An information input apparatus for obtaining a difference image between object images corresponding to irradiated and non-irradiated states, comprising:

an invisible-radiation emitter configured to irradiate an object with invisible radiation;

an area image sensor having imaging units constructed by a two-dimensional matrix of a plurality of invisible-radiation-receiving elements which convert invisible radiation into electrical signals, and a plurality of Charge Coupled Device (CCD) type charge transfer sections configured to transfer and to output charges obtained by said imaging units; and a controller configured to control charge transfer timings from the invisible-radiation-receiving elements to said CCD type charge transfer sections to alternately arrange charges received when said invisible-radiation emitter emits invisible radiation and charges received when said invisible radiation emitter does not emit invisible radiation in a predetermined sequence in all or individual CCD type charge transfer section of said area image sensor.

4. The apparatus according to claim 3, wherein said invisible-radiation emitter is an infrared emitter and said area image sensor is an infrared image sensor.

5. The apparatus according to claim 3, wherein said invisible-radiation emitter is a ultraviolet emitter and said area image sensor is a ultraviolet image sensor.

6. The apparatus according to claim 3, wherein said invisible-radiation emitter is a X-ray emitter and said area image sensor is a X-ray image sensor.

7. The apparatus according to claim 3, wherein said invisible radiation emitter and said area image sensor is a ultrasonic image sensor.

8. The apparatus according to claim 3, further comprising:

a delay line for delaying an output signal from said area image sensor by one horizontal scan time; and a difference circuit, one input of which is connected to said delay line, the other input of which is connected to said area image sensor, and which outputs a difference between two input signals.

* * * * *